United States Patent
Pecen et al.

(10) Patent No.: US 6,631,259 B2
(45) Date of Patent: Oct. 7, 2003

(54) METHOD FOR ENABLING RECEIPT OF A PACKET-SWITCHED PAGE BY A MOBILE STATION

(75) Inventors: Mark Edward Pecen, Rolling Meadows, IL (US); Marcia Otting, Mundelein, IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/539,826

(22) Filed: Mar. 31, 2000

(65) Prior Publication Data

US 2002/0160775 A1 Oct. 31, 2002

(51) Int. Cl.[7] .......................... H04Q 7/20; H04B 15/00; H04B 7/005; H04B 7/01; H04B 7/015
(52) U.S. Cl. .................. 455/426; 455/436; 455/552; 455/553; 370/314
(58) Field of Search ................................ 455/434, 436, 455/426, 552, 553; 370/314

(56) References Cited

U.S. PATENT DOCUMENTS

| | | | |
|---|---|---|---|
| 4,651,156 A | * | 3/1987 | Martinez |
| 4,794,635 A | * | 12/1988 | Hess |
| 4,897,835 A | * | 1/1990 | Gaskill et al. ............... 370/314 |
| 4,984,247 A | * | 1/1991 | Kaufmann et al. |
| 5,117,449 A | * | 5/1992 | Metroka et al. ............. 455/552 |
| 5,257,401 A | * | 10/1993 | Dahlin et al. ............... 455/436 |
| 5,396,539 A | * | 3/1995 | Slekys et al. ............... 455/426 |
| 5,420,911 A | * | 5/1995 | Dahlin et al. ............... 455/553 |
| 6,157,836 A | * | 12/2000 | Cashman ..................... 455/436 |

OTHER PUBLICATIONS

Global System For Mobile Communications Digital Cellular Telecommunications System (Phase 2+) General Packet Radio Service (GPRS) Service Description Stage 2 (GSM 03.60 version 6.6.0 Release 1997), 109 Pages.

* cited by examiner

*Primary Examiner*—William Cumming
(74) *Attorney, Agent, or Firm*—Michael C. Soldner; Roland K. Bowler; Lawrence J. Chapa

(57) ABSTRACT

A mechanism for notifying a mobile station of receipt of a packet-switched paging message in a GSM communication system. A base station controller (108) sends the packet-switched paging message to the mobile station (116) along a main dedicated control channel in response to the mobile station being capable of operating in a dual transfer mode and being currently engaged in circuit-switch voice interchange activity, resulting in a simultaneous voice and data transmission in dual transfer mode.

1 Claim, 3 Drawing Sheets

METHOD FOR ENABLING RECEIPT OF A PACKET-SWITCHED PAGE BY A MOBILE STATION

FIELD OF THE INVENTION

The present invention relates generally to signaling in a GSM communication system, and in particular, the present invention relates to a method for receipt of paging messages from a packet-switched data domain while a mobile station is in a dedicated mode circuit-switched voice connection.

BACKGROUND OF THE INVENTION

Global System for Mobile Communications (GSM) General Packet Radio Service (GPRS) is intended to allow a service subscriber the ability to send and receive data in an end-to-end packet transfer mode without utilizing network resources in the circuit-switched mode. GPRS permits efficient use of radio and network resources when data transmission characteristics are i) packet based, ii) intermittent and non-periodic, iii) possibly frequent, with small transfers of data, e.g. less than 500 octets, or iv) possibly infrequent, with large transfers of data, e.g. more than several hundred kilobytes. User applications may include Internet browsers, electronic mail and so on.

The European Telecommunications Standards Institute (ETSI) GSM specifications define what is referred to as a "mobile station class" for GPRS mobile stations. The mobile station class specifies some of the behavior to which a mobile station must conform regarding its operation in packet mode, circuit-switched mode, or both packet and circuit-switched mode. For example, one such mobile station class is a Class A mobile station which supports simultaneous attachment, monitoring, activation, invocation and traffic flow on both circuit-switched voice and packet-switched data services. On the other hand, a Class B mobile station has been defined to support only simultaneous attachment, monitoring and activation on both circuit-switched voice and packet-switched data services, with invocation and traffic flow possible on either service on a mutually exclusive basis. Finally, a Class C mobile station is defined to support only non-simultaneous attach, i.e. mutually exclusive attach, on either circuit-switched voice or packet-switched data services.

Mobile station classes may also be assigned, or changed, either by automatic means, or in some cases by the user, subject to limitations, such as manufacturer's options and equipment limitations. For example, a user application may have the ability to issue a command to change the mobile station class of the subscriber equipment currently in use. The mobile station classes are therefore to be treated as "effective" classes, as users may exercise some control over mobile station class identity.

Efforts are presently underway to further develop ETSI GPRS specifications to specify required channelisation and signaling techniques that allow a mobile station, having a single receiver/transmitter, to handle a simultaneous GSM voice and packet session. This effort has led to the creation of a dual transfer mode (DTM), in which both GSM voice and GPRS, or EDGE, data can be interchanged on the same radio frequency (RF). When the mobile station is operated in dual transfer mode, the operational context of the mobile station contains an active circuit-switched voice connection in dedicated mode, and an active packet-switched temporary block flow (TBF) in GPRS/EDGE packet transfer mode.

One of the problems associated with providing a Class A capable mobile station having a single transceiver is that in currently known GSM systems, a packet-switched paging message is specified to be sent from a base station subsystem to a mobile station along a paging channel (PGCH). As a result, if a packet-switched paging message is sent to the mobile station while the mobile station is engaged in a circuit-switched voice call along a traffic channel, the mobile station is unable to receive the packet-switched domain paging message, and therefore the mobile station is unable to respond to paging messages from the packet domain while in a dedicated mode circuit-switched voice connection.

Accordingly, what is needed is a method for receipt and handling of a paging message that originates from the packet-switched domain while a mobile station is engaged in a circuit-switched domain voice call.

BRIEF DESCRIPTION OF THE DRAWINGS

The features of the present invention which are believed to be novel are set forth with particularity in the appended claims. The invention, together with further objects and advantages thereof, may best be understood by making reference to the following description, taken in conjunction with the accompanying drawings, in the several figures of which like reference numerals identify like elements, and wherein:

DETAILED DESCRIPTION OF THE PREFERRED EMBODIMENT

The present invention is a method for a simple single-transceiver mobile station to monitor a paging block on a combined control channel (CCCH) or packet combined control channel (PBCCH) while a dedicated traffic channel (TCH) is set up and operational for the interchange of voice data. A signaling path is created, utilizing an existing dedicated control channel (DCCH), by which the mobile station is notified of a paging message arriving from the packet-switched domain while the mobile station is engaged in exchange of circuit-switched traffic in dedicated circuit-switched mode.

Figure 1:
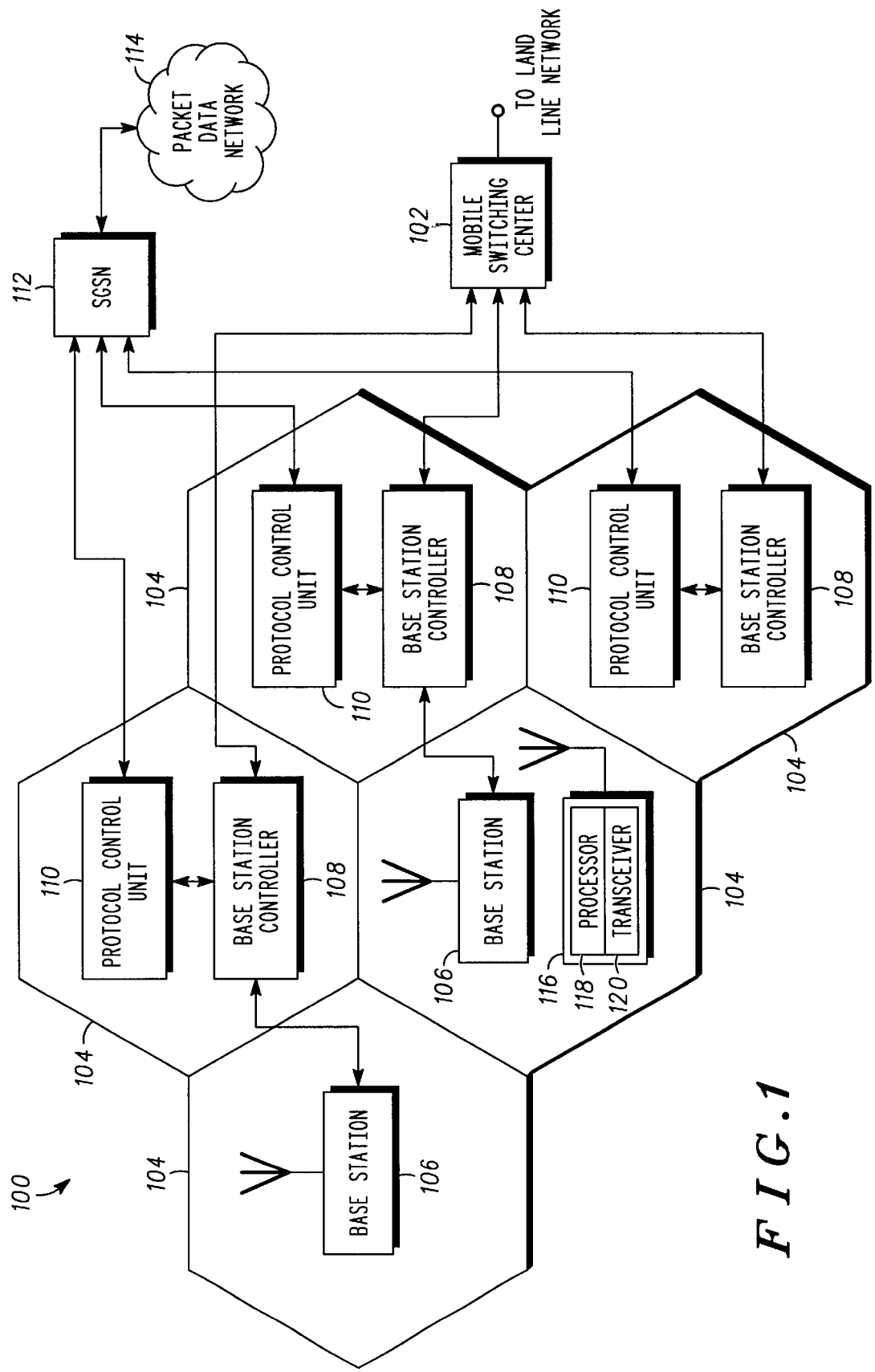
FIG. 1 is a schematic diagram of a communication network in a GSM system.

As illustrated in FIG. 1, a communication network 100 includes a mobile switching center 102, and a plurality of cell sites 104. Each cell site 104 includes a base station 106 coupled to a base station controller 108. A protocol control unit 110 is coupled to or contained within each base station controller 108, and each protocol unit 110 interfaces with a Serving GPRS Support Node (SGSN) 112 which in turn interfaces with a packet data network 114. The SGSN 112 can also be connected to other SGSNs belonging to other service providers, which in turn can also be connected to other SGSNs, and so forth.

A mobile station 116, such as wireless telephone device, is adapted to communicate with base stations associated with each base station controller 108 to maintain communications with another mobile station, wireline unit associated with a land line network, or the packet data network 114. The mobile station 116 includes a transceiver 118 to receive signals from, and to transmit signals to the base station controller 108, and a processor 120 to process the signals sent to and received from the base station controller 108. The SGSN 112 keeps track of the location of the mobile station 116, and performs security functions and access control. It is understood that although only one mobile station 116 is shown in FIG. 1, more than one mobile station is located within the communication network 100 at one time.

Figure 2:
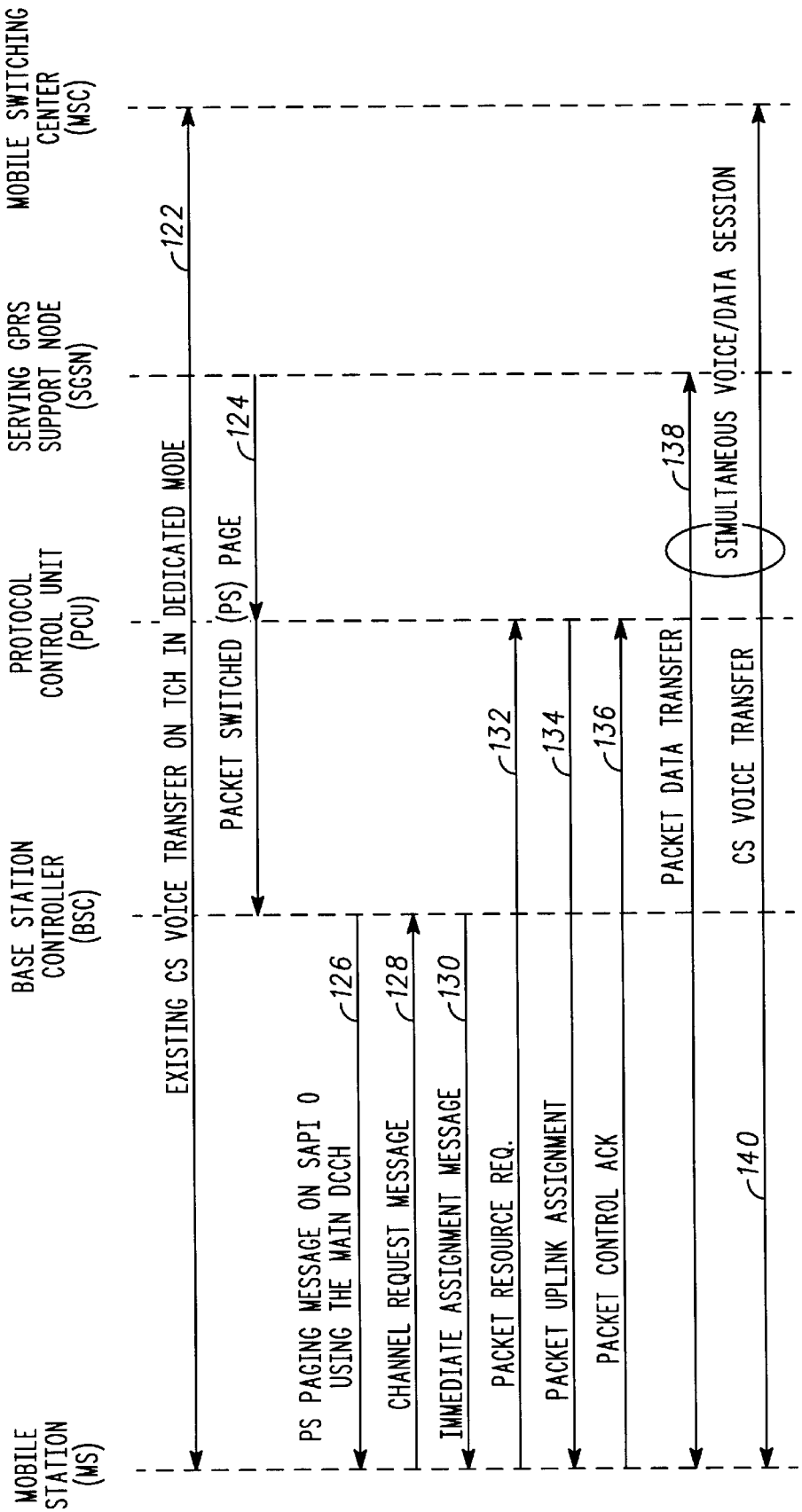
FIG. 2 is a signal flow diagram of a signaling path in a communication network, according to the present invention.

FIG. 2 is a signal flow diagram illustrating a signaling path in a GSM communication network according to the present invention. As illustrated in FIGS. 1 and 2, when the mobile station 116 is initially engaged in circuit-switched voice interchange activity, existing circuit-switched voice transfer, line 122 of FIG. 2, takes place along a traffic channel between the mobile station 116 and the mobile switching center 108 in a dedicated circuit-switched mode. When packet-switched information addressed to the same mobile station 116 is received by the SGSN 112 from the data packet network 114, line 124, the SGSN 112 sends a packet-switched page to the base station controller 108 through the protocol control unit 110. Upon receiving the packet-switched page, the base station controller 108 determines whether the mobile station 116 is capable of operating in a dual transfer mode, based on a class mark of the mobile station 116, and whether the mobile station 116 is currently engaged in circuit-switched voice interchange activity.

According to the present invention, if the base station controller 108 determines that either the mobile station 116 is not capable of operating in dual transfer mode, or that the mobile station 116 is not currently engaged in circuit-switched voice interchange activity, a packet-switched paging message is sent to the mobile station 116 along the paging channel. However, according to the present invention, if the base station controller 108 determines both that the mobile station 116 is capable of operating in dual transfer mode, and that the mobile station 116 is currently engaged in circuit-switched voice interchange activity, the base station controller 108 sends the packet-switched paging message, indicated by line 126 of FIG. 2, to the mobile station 116 on SAPI 0 (service access point identifier zero) using a main dedicated control channel (DCCH). The transceiver 118 of the mobile station 116 receives the packet-switched paging message along the DCCH. In this way, according to the present invention, the packet-switched paging message is sent from the base station controller 108 to the mobile station 116 along the main dedicated control channel, rather than along the dedicated paging channel.

In currently known channelization and signaling techniques, the packet-switched paging message is sent from the base station controller 108 to the mobile station 116 along the dedicated paging channel. Since the dedicated paging channel is not monitored by the mobile station when the mobile station is operating in circuit-switched dedicated mode, the mobile station cannot be notified of a packet-switched paging message while the mobile station is engaged in circuit-switched voice interchange activity. The present invention provides a signaling path utilizing an existing dedicated control channel, by which a mobile station is notified of a packet-switched domain paging message while the mobile station is engaged in exchange of circuit-switched traffic in a dedicated mode.

Message sequences for packet-transfer mode set up are known. For example, when the packet-switched paging message is received by the transceiver 118, the processor 120 of the mobile station 116 processes the packet-switched paging message and instructs the mobile station 118 to send a channel request message to the base station controller 108, indicated by line 128 of FIG. 2, requesting access to a channel. The base station controller 108 responds to the channel request message by sending an immediate assignment message, indicated by line 130 of FIG. 2, to the mobile station 116 indicating an access channel. The mobile station 116 then sends a packet resource request along the indicated access channel through the transceiver 118, which is received by the protocol control unit 110 of the base station controller 108. The protocol control unit 108 responds by sending an packet uplink assignment, containing packet resources specific to the packet-switched paging message, to the mobile station 116, indicated by lines 132 and 134 of FIG. 2. The mobile station 116 responds by sending a packet control acknowledge message to the protocol control unit 108 through the base station controller 110, indicated by line 136 of FIG. 2.

Another possible messaging sequence would involve implicitly removing, upon receipt of the packet-switched paging message on SAPI 0 of the main dedicated control channel, the requirement for sending the channel request message and the immediate assignment message, lines 128 and 130 of FIG. 2, since the reception of the packet-switched paging message by the mobile station would constitute an implicit assignment to the main dedicated control channel. As a result, upon receipt of the paging message, line 126 of FIG. 2, the processor 118 of the mobile station 116 automatically assigns the mobile station 116 to the main dedicated control channel as an access channel, so that by being implicitly assigned to the dedicated control channel, it is no longer necessary for the mobile station to send the channel request message, line 128 of FIG. 2, or for the base station controller to send an immediate assignment message, line 130 of FIG. 2.

According to the present invention, the signaling sequences corresponding to lines 126–136 of FIG. 2, processed by the processor 120 and the base station controller 108 and protocol control unit 110, occur over the main dedicated control channel, rather than over the paging channel, which is not monitored by the mobile station 116 when the mobile station 116 and mobile switching center 108 are in circuit-switched dedicated mode. Once these signaling sequences are completed, a packet data transfer is created along with the circuit-switched voice interchange activity, indicated by lines 138 and 140 of FIG. 2, resulting in a simultaneous voice and data transmission in dual transfer mode. The simultaneous voice and data transmission session, lines 138 and 140, requires at least an Lm+Lm channel for simultaneous voice and data. This Lm+Lm channel preferably includes one-half traffic channel and one-half packet data channel (TCH/H+PDCH/H), or may optionally include a full traffic channel plus one or more contiguous packet data channels (TCH/F+PDCH/F).

Figure 3:
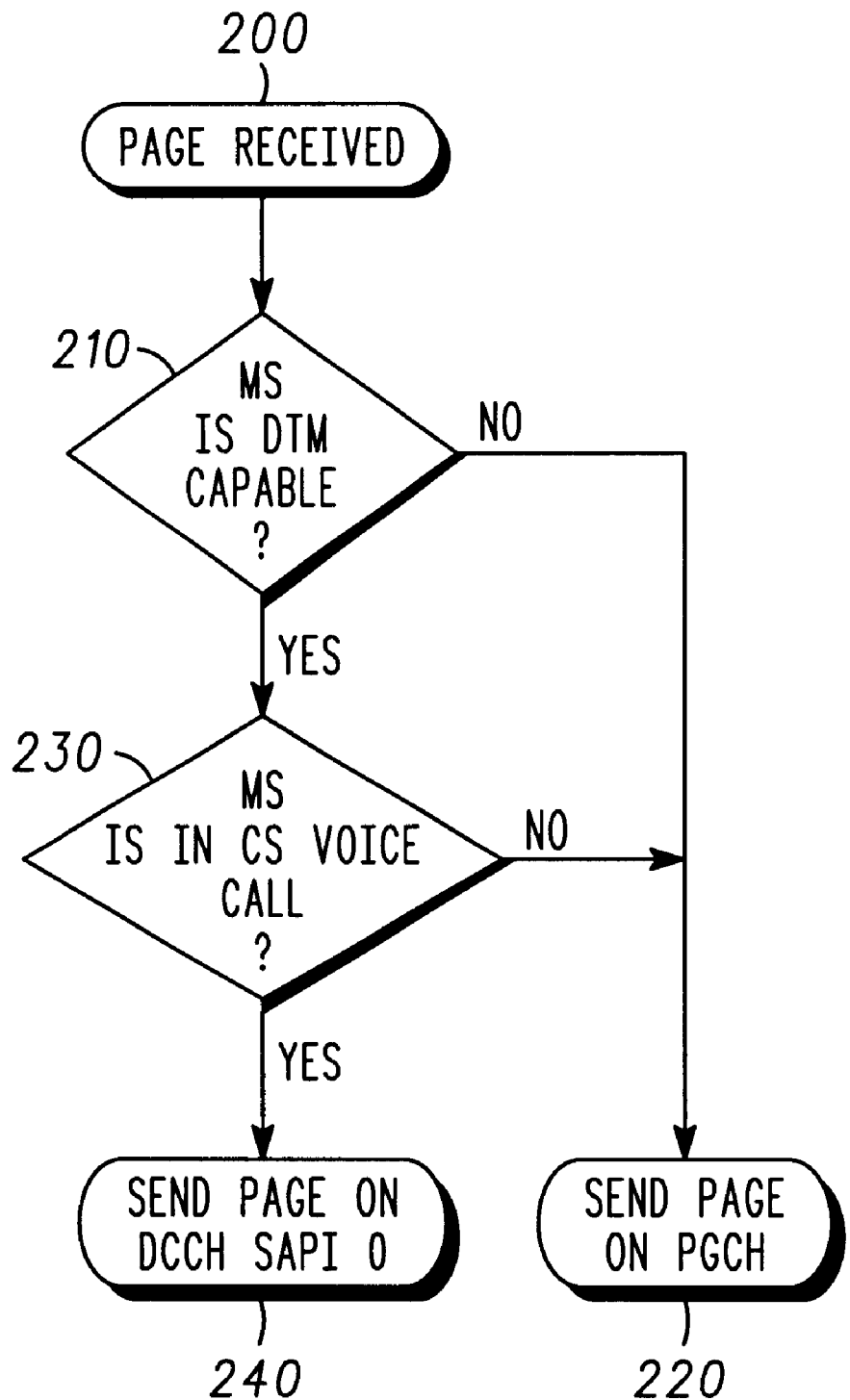
FIG. 3 is a flowchart of a mechanism for notifying a mobile station of a packet-switched paging message, according to the present invention.

FIG. 3 is a flow chart of a mechanism in a communication network for notifying a mobile station of a packet-switched paging message, according to the present invention. As illustrated in FIG. 3, after a packet-switched paging message originating from a packet-switched domain is received by a base station controller from a serving GPRS support node, Step 200, the base station controller determines whether the mobile station is capable of operating in dual transfer mode, Step 210, using the mobile station class mark. If the base station controller determines the mobile station is not capable of operating in dual transfer mode, the packet-switched paging message is sent to the mobile station on the paging channel (PGCH), Step 220.

If the base station controller determines that the mobile station is capable of operating in a dual transfer mode in Step 210, the base station controller then determines whether the mobile station is currently engaged in circuit-switched voice interchange activity, Step 230. If the base station controller determines in Step 230 that the mobile station is not currently engaged in circuit-switched voice interchange activity, the packet-switched paging message is sent to the mobile station on the paging channel (PGCH), Step 220. On the other hand, if the base station controller determines in Step 230 that the mobile station is currently engaged in circuit-switched voice interchange activity, the packet-switched paging message is sent from the base station controller to the mobile station on SAPI 0 using a main dedicated control channel.

In this way, the present invention provides a mechanism for receipt and handling of a paging message that originates from a packet-switched domain while a mobile station is engaged in a circuit-switched domain voice call.

While a particular embodiment of the present invention has been shown and described, modifications may be made. It is therefore intended in the appended claims to cover all such changes and modifications which fall within the true spirit and scope of the invention.

What is claimed is:

1. A method for receiving notification at a dual transfer mode mobile station, operating in circuit-switched voice interchange activity, of a packet-switched paging message, comprising:

engaging said mobile station in circuit-switched voice interchange activity, wherein said mobile station having dual transfer mode capability is a Class A mobile station which supports simultaneous attachment, monitoring, activation invocation and traffic flow on both circuit-switched voice and packet-switched data services, and wherein said mobile station having dual transfer mode capability is a Class B mobile station which supports simultaneous attachment, monitoring and activation on both circuit-switched voice and packet-switched data services, with invocation and traffic flow possible on either service on a mutually exclusive basis, and wherein said mobile station not having dual transfer capability is a Class C mobile station supporting only non-simultaneous attach on either circuit-switched voice or packet-switched data services;

receiving a packet-switched paging notification message over said dedicated control channel, while said mobile station is engaged in circuit-switched voice interchange activity, if said mobile station is operating in dual transfer mode; and receiving the packet-switched paging notification message over a paging channel, while said mobile station is engaged in circuit-switched voice interchange activity, if said mobile station is not operating in dual transfer mode.

* * * * *